United States Patent
Yaldir

(10) Patent No.: US 6,837,515 B2
(45) Date of Patent: Jan. 4, 2005

(54) COATING FOR A DASHBOARD, A STEERING WHEEL OR THE LIKE

(75) Inventor: Tanju Yaldir, Eningen (DE)

(73) Assignee: Eissmann GmbH, Bad Urach (DE)

( * ) Notice: Subject to any disclaimer, the term of this patent is extended or adjusted under 35 U.S.C. 154(b) by 143 days.

(21) Appl. No.: 10/010,378

(22) Filed: Dec. 6, 2001

(65) Prior Publication Data

US 2002/0081922 A1 Jun. 27, 2002

(30) Foreign Application Priority Data

Dec. 9, 2000 (DE) .......................................... 100 61 438

(51) Int. Cl.$^7$ .............................................. B60R 21/16
(52) U.S. Cl. ................ 280/732; 280/728.1; 280/728.2; 280/728.3; 280/732; 428/304.4; 442/149
(58) Field of Search ............................. 280/728.1, 732, 280/728.2, 728.3; 428/304.4; 442/149

(56) References Cited

U.S. PATENT DOCUMENTS

| | | |
|---|---|---|
| 5,498,022 A | 3/1996 | Papandreou et al. |
| 5,611,564 A | 3/1997 | Bauer |
| 5,650,115 A | 7/1997 | Proos et al. |
| 5,839,752 A | 11/1998 | Yamasaki et al. |
| 5,957,483 A | 9/1999 | Miltenberger et al. |
| 6,070,901 A | 6/2000 | Hazell et al. |

FOREIGN PATENT DOCUMENTS

| | | |
|---|---|---|
| DE | 44 11 283 C1 | 5/1995 |
| DE | 196 53 797 A1 | 6/1998 |
| DE | 198 04 999 A1 | 8/1999 |
| EP | 105 7698 A | 12/2000 |
| WO | 97/03866 | 2/1997 |
| WO | 99/58375 | 11/1999 |

*Primary Examiner*—Arti R. Singh
(74) *Attorney, Agent, or Firm*—Michael J. Striker

(57) ABSTRACT

A coating for a structure with an integrated airbag has a coating element which has a portion operative for covering an airbag box and being perforated in a region of an edge of the portion for covering the airbag box.

11 Claims, No Drawings

COATING FOR A DASHBOARD, A STEERING WHEEL OR THE LIKE

BACKGROUND OF THE INVENTION

The present invention relates to coating for a dashboard, a steering wheel or the like.

In almost all motor vehicles nowadays airbags are integrated in a dashboard at a passenger side. Until now the coating of the dashboard in the region of the airbag is not provided. There the cover of the airbag box is located. However, in the automobile industry, there is a desire to integrate the airbag in the motor vehicle as invisible as possible. For this reason coatings for dashboards are proposed, which cover also the airbag box cover and in the region of the edge of the airbag box cover are slit from the rear side, to define in this location breakage points when the airbag spreads out.

Since the coatings are frequently produced of leather, which has no homogenous properties and in its three-dimensional fiber structure has a very high strength, it has been determined that this slitting of the coating material must be significant so as to provide unhindered spreading out of the airbag. Then the coating material in the region of the material weakening is so thin that due to significant temperature and moisture differences acting in a motor vehicle, the material weakening line also is formed on the outer side. Therefore the objective of an invisible accommodation of the airbag is not achieved.

SUMMARY OF THE INVENTION

Accordingly, it is an object of the present invention to provide a coating for a dashboard or the like with an integrated airbag, which avoids the disadvantages of the prior art.

More particularly, it is an object of the present invention to provide a coating for a dashboard and the like with an integrated airbag, in which the airbag is covered from outside in an invisible manner and nevertheless provides a reliable release of the airbag when needed.

In keeping with these objects and with others which will become apparent hereinafter, one feature of the present invention resides, briefly stated, in a coating for a dashboard, a steering wheel and the like with an integrated airbag, which has a coating element with a coating portion formed to cover an airbag box and which in a region of an edge of said coating portion is perforated.

The novel features which are considered as characteristic for the present invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

In accordance with the present invention a coating is proposed for a dashboard, a steering wheel and the like with an integrated airbag, which has a coating element with a coating portion formed to cover an airbag box and which in a region of an edge of said coating portion is perforated.

The perforations have material passages, so that during spreading out of the airbag the material webs between the passages must be separated. This must be guaranteed by a corresponding thickness of the passages of the perforations. The passages in the material can be relatively small, so that they are not visible from the outer side. This is true in particular for a slightly elastic coating material such as leather, synthetic leather, covering substance, etc.

The perforation openings can be filled additionally with a filler or an adhesive or the like. During the manufacture of the coating of leather, the leather can be perforated curried or uncurried and filled. For filling of the perforation openings for example a leather filler, in some cases with an admixture can be used. The filling mass serves for making the openings invisible from outside, and also so that during significant temperature fluctuations the breakage points can not be recognized visually.

The filling mass does not hinder a separation of the coating along the perforation line in emergency situations.

The use of an adhesive for filling the passages has the function of joining the perforations so that a definite thrust force is guaranteed for the airbag. The adhesive must have not only a residual force, but also must not prevent the release of the airbag.

The perforations can be also optically tinted. For this purpose for example one thread is pulled through for simulation of a seam through the perforation opening.

The openings of the perforations can be produced by punching, by means of a laser, a needle, a c utter blade or a cutting device. Another manufacturing possibilities include producing the openings by piercing of the material of the coating with a high pressure water jet. For producing the openings the material must be removed, eliminated, cut etc.

In the practice a material thickness of 0.61–2.8 mm is recommended for the coating. The perforation openings can be provided with a diameter of 0.1–0.5 mm.

The distance between the individual openings must be dimensioned for example so that the coating during opening of the airbag can be separated along the perforation line.

It is also possible to provide the perforation openings on the side of the coating facing the airbag with a greater diameter than at the visible side. The visible and/or the airbag side moreover can be provided with a leather curry, a foam or a similar varnishing. Also a multi-layer construction of the coating is possible.

It will be understood that each of the elements described above, or two or more together, may also find a useful application in other types of constructions differing from the types described above.

While the invention has been illustrated and described as embodied in a coating for a dashboard, a steering wheel and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A coating for a structure with an Integrated airbag, comprising a coating element which has a portion operative for covering an airbag box and being perforated in a region of an edge of said portion for covering the airbag box, and further comprising a plurality of perforation openings provided in the region of said edge of said portion, wherein said perforation openings at a side adapted to face the airbag have a greater diameter than at a visible side.

2. A coating as define in claim 1; and further comprising filling said perforation openings.

3. A coating as defined in claim 1, wherein said coating element is composed of a material selected from the group consisting of leather, synthetic leather, and a covering substance.

4. A coating as defined in claim 1, wherein said coating element has a thickness of between 0.6 mm and 2.8 mm.

5. A coating as defined in claim 1; and further comprising varnishing means provided at a visible side of said coating element and selected from the group consisting of a curry and a foam.

6. A coating as defined in claim 1; and further comprising varnishing means provided at a side of said coating element adapted to face the airbag and selected from the group consisting of a curry and a foam.

7. A coating as defined in claim 1, wherein said coating element is a multi-layered coating element.

8. A coating as defined in claim 2, wherein said filling means is means selected from the group consisting of a filler mass and an adhesive.

9. A coating as defined in claim 2, wherein said perforation openings are punching-produced perforation openings.

10. A coating as defined in claim 2, wherein said perforation openings are openings produced by piercing of a material of said coating element with means selected from the group consisting of a high pressure water jet, a laser, a needle, a cutter blade and a cutting device.

11. A coating as defined in claim 2, wherein said perforation openings have a diameter of 0.1 mm to 0.5 mm.

\* \* \* \* \*